Nov. 24, 1959  J. COUGNARD  2,914,602
DOUBLE ACTING DEIONIZING DEVICE FOR AERIAL ELECTRIC LINES
Filed Feb. 20, 1956  3 Sheets-Sheet 1

INVENTOR
Jerome COUGNARD
BY
ATTORNEYS

Nov. 24, 1959                J. COUGNARD                2,914,602
DOUBLE ACTING DEIONIZING DEVICE FOR AERIAL ELECTRIC LINES
Filed Feb. 20, 1956                                    3 Sheets-Sheet 2
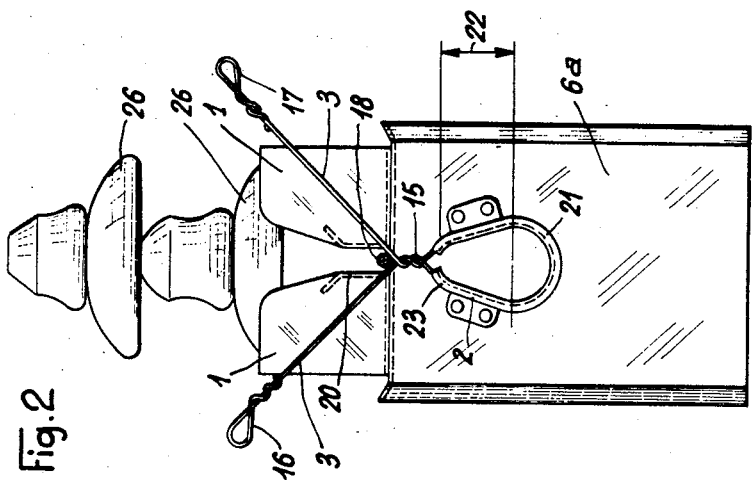
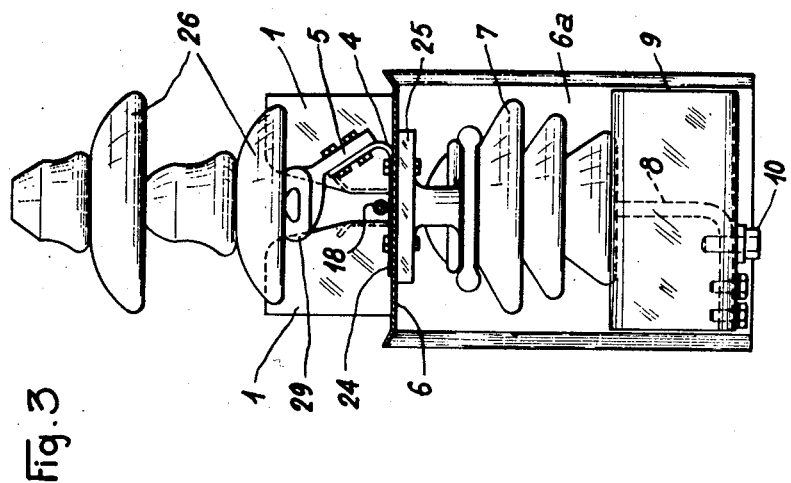
INVENTOR
Jerome COUGNARD
BY
ATTORNEYS

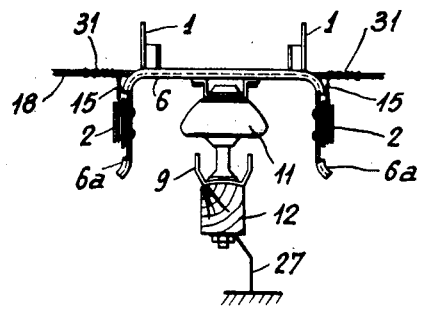
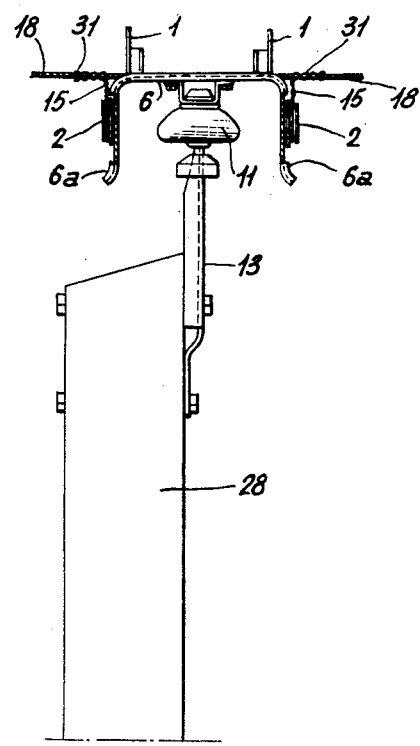

United States Patent Office 2,914,602
Patented Nov. 24, 1959

2,914,602
DOUBLE ACTING DEIONIZING DEVICE FOR AERIAL ELECTRIC LINES
Jérôme Cougnard, Nanterre, France
Application February 20, 1956, Serial No. 566,710
Claims priority, application France April 30, 1955
8 Claims. (Cl. 174—140)

The invention relates to double-acting deionizing devices for aerial electric lines, of the kind comprisng an electrode formed by a sheet of conducting material having the shape of an inverted U, said electrode supporting the line conductor and being electrically connected to the latter, and the depending side portions of said electrode being placed perpendicularly to said line conductor.

The improvements forming the subject matter of the present invention have for their main object to allow the mounting and removal of the line conductor while the line is live, for example in view of the replacement of an insulator.

To this effect, said electrode is provided at each end of its upper portion with a pair of upwardly directed guide members forming between themselves an interval adapted to receive the line conductor, and each depending side portion of said electrode carries on its outer face a thimble, preferably in the shape of a horse-collar, having a peripheral groove adapted to receive a wire for attaching the line conductor.

Advantageously, the adjacent edges of the guide members of each pair are bent so as to form large supporting surfaces for the line conductor.

Advantageously again, the width of the interval formed between the guide members of each pair increases in the upward direction.

Other features of the invention will be described in the following specification, with reference to the appended drawings which represent, by way of non limitative examples, several embodiments of the invention applied to various types of devices.

On the drawings:

Fig. 2 is an elevational view of the same device, taken in the direction of the line conductor.

Fig. 3 is a cross section on line III—III of Fig. 1.

Fig. 5 is a schematical elevation, taken in the direction of the line conductor, of a device similar to that represented on the preceding figures, but carried by a rigid insulator mounted on a wood or metal structure.

Fig. 6 represents schematically a similar device mounted on top of a post.

Figure 1:
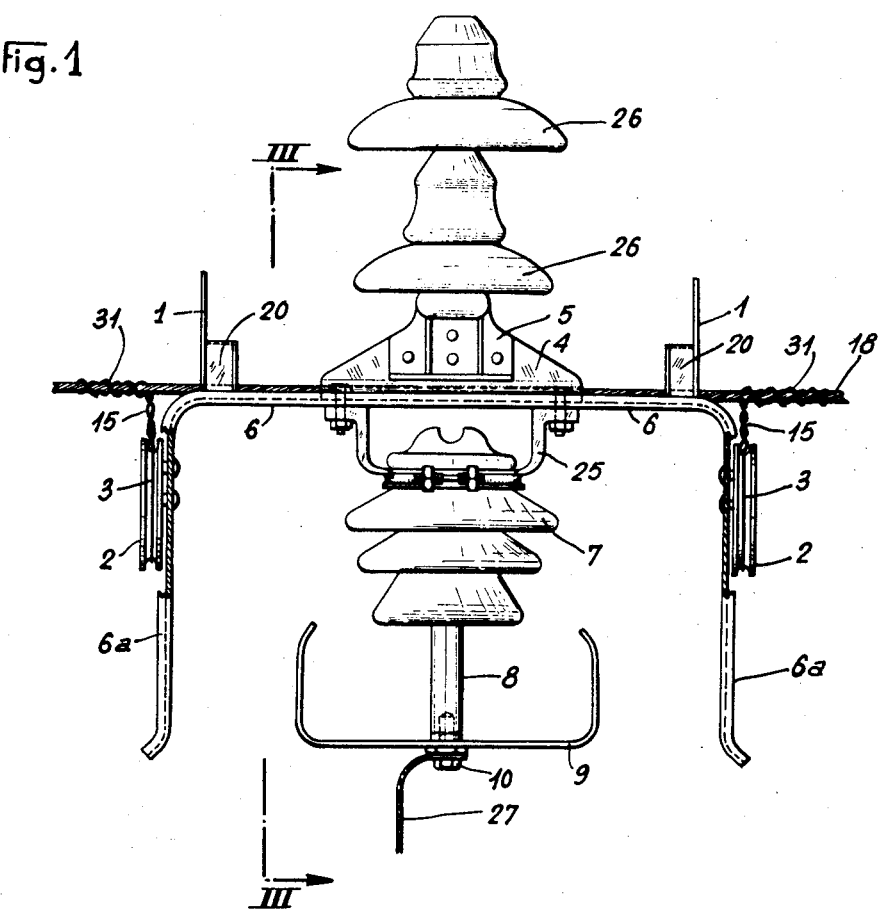
Fig. 1 is an elevational view, taken perpendicularly to the line conductor, of a deionizing device suspended from a chain of insulators.

In Figs. 1 to 4, the references 6, 6a designate an electrode formed by an electrically conductive metal sheet in the shape of an inverted U, the depending side portions 6a of said electrode being placed perpendicularly to the line conductor 18 which rests on the upper portion 6 of the electrode.

The electrode 6, 6a is suspended from a chain of insulators 26 by means of a bracket 4 secured to a piece of malleable cast iron 5 (see Fig. 3) carrying a ball and socket joint 29 attached to the lowermost insulator 26.

Below the upper portion 6 of the electrode, collars 25 carry an insulator 7 to which is attached a bracket 8 carrying an electrode 9 in the shape of an upright U which is grounded by a conductor 27 attached to a terminal 10.

The upstanding side portions of the grounded electrode 9 face in parallel relation the depending side portions 6a of the electrode 6 which is connected to the line conductor 18.

On each end of the upper portion 6 of the electrode 6, 6a is mounted a pair of upstanding guide members 1 which form between themselves an interval adapted to receive the line conductor 18. This interval preferably increases in width in the upward direction, as clearly shown on Fig. 2.

Figure 4:
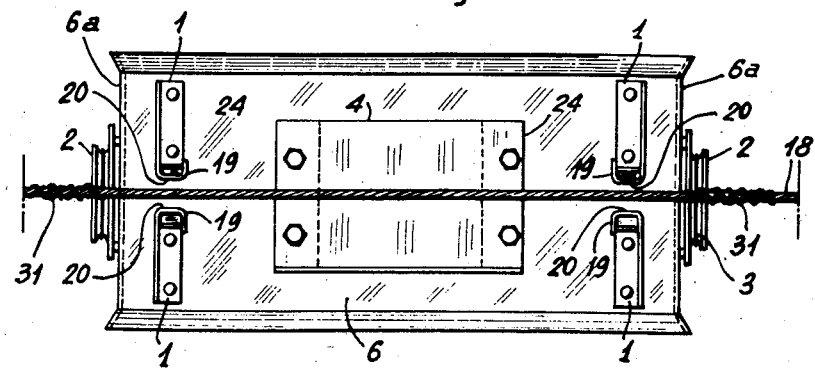
Fig. 4 is a plan view of the tension carrying electrode with its guide members and thimbles.

The adjacent edges of the guides 1 of each pair are bent, at least at their lower part, as shown at 19 on Fig. 4, so as to form large supporting surfaces 20 for the line conductor 18.

The suspending bracket 4 has the shape of a lying V (see Fig. 3) so as to provide for the free passage of the line conductor 18 along the middle line of the upper electrode portion 6. The edges 24 of the bracket 4 are ground so as to avoid wear of the conductor 18 on these edges.

To the outer face of each depending side portion 6a of the electrode 6, 6a is secured a thimble 2 formed with a peripheral groove adapted to receive a wire 3 of tempered stainless metal by which the line conductor 18 is attached, as it will be described hereinafter.

Fig. 5 represents schematically a deionizing device which is similar to that shown on Figs. 1 to 4, but which, instead of being suspended from a chain of insulators 26, is supported by a rigid insulator 11 mounted on a beam 12 of wood or metal.

Fig. 6 represents schematically a deionizing device similar to that of Fig. 5, but mounted on a rod 13 which is secured to the top of a post 28.

When a live line conductor is to be mounted on a deionizing device of any of the described embodiments, for example on that of Figs. 1 to 4, a wire 3 of tempered stainless metal is first placed around each thimble 2 and is twisted, for example two turns, as shown at 15 on Fig. 1. The wire 3 thus forms two branches, at the end of which loops 16 and 17 (Fig. 2) have been previously formed in order to make it possible to operate the wire 3 from a distance, for example by means of a pole of insulating material. The device being thus prepared, the line conductor 18 is placed by means of the pole between the guide members 1, and one branch of the wire 3, for example that carrying the loop 16, is wound either directly on the line conductor 18, or on a protective sheath covering the portion of the line conductor which overlies the deionizing device. The wire branch carrying the loop 16 being thus wound on the line conductor 18, the other wire branch, which carries the loop 17, is wound on the windings of the first mentioned wire branch, in the opposite direction. The winding of the wire branches is stopped at a short distance from the loops 16, 17, so that they can easily be seized and unwound by means of the pole, when it is desired to remove the line conductor 18. The windings of the wire 3 on the line conductor 18 are designated by the reference 31 on Figs. 1 and 4 to 6.

The line conductor being thus mounted on one end of the device, its mounting on the opposite end is made in the same manner.

When the line conductor 18 thus mounted on the device is pushed by the wind, it can frictionally engage the guide members 1 without wear, due to the bent portions 19 and the large surfaces 20 formed on said guide members 1. The latter form between themselves an interval the width of which increases towards the top, so that the line conductor 18 is easily placed in said interval by means of a pole.

The thimbles 2 have preferably the shape of a horse-collar (see Fig. 2) and the radius of curvature 21 of their lower portion is great enough to avoid wear of the tempered attaching wire 3. The horse-collar shape is important, for once the twists 15 are made, this shape avoids rotation of the attachment about the thimble, while such rotation would occur if the thimbles 2 were completely circular. With the thimbles shaped like horse-collars, rotation is prevented due to the fact that the distance 22 (Fig. 2) between the center of the lower thimble portion 21 and the top of the thimble is considerably greater than the radius of said lower thimble portion. At their upper part, the thimbles 2 have also a round-off 23 in order to avoid wear of the attachment wire due to trepidations caused by the wind.

By the above described arrangement, the line conductor 18 is secured against transversal displacements by the firm attachment. If the attachment loosens itself with the time, the line conductor comes to rest against the surfaces 20 of the guide members 1, in the direction of the wind, and remains stationary in this position.

The mode of attachment of the line conductor 18 by means of the branches of the wire 3 permits said line conductor to displace itself longitudinally, whereby unequal loads, caused for example by frost, can be balanced.

It will be understood that the invention is not limited to the embodiments which have been described and shown, but covers also any other embodiments falling within the scope of the appended claims.

I claim:

1. A double-acting deionizing device for aerial electric lines, comprising an inverted U-shaped electrode of electrically conducting sheet material having an upper portion and two side portions depending from opposite ends of said upper portion, insulating supporting means attached to said upper portion, a pair of upwardly directed guide members mounted on each end of said upper portion, said guide members of each pair forming between themselves an upwardly open interval, a thimble formed with a peripheral groove mounted on the outer face of each of said depending side portions, a line conductor placed on said upper portion and passing through said intervals formed between said guide members, and a wire passed around the periphery of each of said thimbles and wound on the portion of said line conductor overlying said thimble.

2. A double-acting deionizing device as claimed in claim 1, wherein the inner edges of said guide members of each pair are bent so as to form supporting surfaces, the supporting surface on the inner edge of each guide member of a pair facing the supporting surface on the inner edge of the other guide member of said pair.

3. A double-acting deionizing device for aerial electric lines, comprising an inverted U-shaped electrode of electrically conducting sheet material having an upper portion and two side portions depending from opposite ends of said upper portion, insulating supporting means attached to said upper portion, a pair of upwardly directed guide members mounted on each end of said upper portion, said guide members of each pair forming between themselves an upwardly increasing interval, a thimble formed with a peripheral groove mounted on the outer face of each of said depending side portions, a line conductor placed on said upper portion and passing through said intervals formed between said guide members, perpendicularly to said depending side portions, and a wire passed around the periphery of each of said thimbles, the end portions of each said wire being twisted on each other and wound in opposite directions on the portion of said line conductor overlying said thimble.

4. A device as claimed in claim 3, wherein a loop is formed at each end of each of said wires.

5. A double-acting deionizing device for aerial electric lines, comprising an inverted U-shaped electrode of electrically conducting sheet material having an upper portion and two side portions depending from opposite ends of said upper portion, insulating supporting means attached to said upper portion, a pair of upwardly directed guide members mounted on each end of said upper portion, said guide members of each pair forming between themselves an upwardly open interval, a thimble mounted on the outer face of each of said depending side portions, each of said thimbles being formed with a peripheral groove and having the shape of a horse-collar whose larger portion is placed downwards, a line conductor placed on said upper portion and passing through said intervals formed between said guide members, and a wire passed around the periphery of each of said thimbles and wound on the portion of said line conductor overlying said thimble.

6. A double-acting deionizing device for aerial electric lines, comprising an inverted U-shaped electrode of electrically conducting sheet material having an upper portion and two side portions depending from opposite ends of said upper portion, an insulator, a ball and socket joint connecting said upper portion to said insulator, a pair of upwardly directed guide members mounted on each end of said upper portion, said guide members of each pair forming between themselves an upwardly open interval, a thimble formed with a peripheral groove mounted on the outer face of each of said depending side portions, a line conductor placed on said upper portion and passing through said intervals formed between said guide members, and a wire passed around the periphery of each of said thimbles and wound on the portion of said line conductor overlying said thimble.

7. A double-acting deionizing device for aerial electric lines, comprising an inverted U-shaped electrode of electrically conducting sheet material having an upper portion and two side portions depending from opposite ends of said upper portion, a bracket in the shape of a lying V attached to the upper face of said upper portion, an insulator, a ball and socket joint connecting said bracket to said insulator, a pair of upwardly directed guide members mounted on each end of said upper portion, said guide members of each pair forming between themselves an upwardly open interval, a thimble formed with a peripheral groove mounted on the outer face of each of said depending side portions, a line conductor placed on said upper portion and passing through said intervals formed between said guide members, and a wire passed around the periphery of each of said thimbles and wound on the portion of said line conductor overlying said thimble.

8. A double-acting deionizing device for aerial electric lines, comprising an inverted U-shaped electrode of electrically conducting sheet material having an upper portion and two side portions depending from opposite ends of said upper portion, a bracket in the shape of a lying V attached to the upper face of said upper portion, the side edges of said bracket being rounded off, an insulator, a ball and socket joint connecting said bracket to said insulator, a pair of upwardly directed guide members mounted on each end of said upper portion, said guide members of each pair forming between themselves an upwardly open interval, a thimble formed with a peripheral groove mounted on the outer face of each of said depending side portions, a line conductor placed on said upper portion and passing through said intervals formed between said guide members, and a wire passed around the periphery of each of said thimbles and wound on the portion of said line conductor overlying said thimble.

References Cited in the file of this patent

UNITED STATES PATENTS

| | | |
|---|---|---|
| 1,061,823 | Cronin | May 13, 1913 |
| 1,725,610 | Byl | Aug. 20, 1929 |
| 2,182,342 | Karitzky | Dec. 5, 1939 |
| 2,238,532 | Nothe | Apr. 15, 1941 |
| 2,629,765 | Cougnard | Feb. 24, 1953 |